United States Patent
Pham et al.

(10) Patent No.: US 9,939,857 B1
(45) Date of Patent: Apr. 10, 2018

(54) CHASSIS AND HARD DRIVE

(71) Applicant: HEWLETT PACKARD ENTERPRISE DEVELOPMENT LP, Houston, TX (US)

(72) Inventors: Kenny Huy Pham, Houston, TX (US); Ronald Pinche Tsai, Richardson, TX (US); Keith A Sauer, Spring, TX (US); Kelly K Smith, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/463,658

(22) Filed: Mar. 20, 2017

(51) Int. Cl.
- *G06F 1/16* (2006.01)
- *H05K 5/00* (2006.01)
- *H05K 7/00* (2006.01)
- *G06F 1/18* (2006.01)

(52) U.S. Cl.
CPC .................................. *G06F 1/187* (2013.01)

(58) Field of Classification Search
CPC ............ G06F 1/18; G06F 1/183; G06F 1/187
USPC ........................ 361/679.31–679.39, 724–727
See application file for complete search history.

(56) References Cited

U.S. PATENT DOCUMENTS

| | | | |
|---|---|---|---|
| 5,003,431 A | 3/1991 | Imsdahl | |
| 5,277,615 A | 1/1994 | Hastings | |
| 6,122,173 A * | 9/2000 | Felcman | G06F 1/16 312/223.1 |
| 6,648,149 B2 | 11/2003 | Robertson | |
| 6,862,178 B2 | 3/2005 | Liao | |
| 7,423,870 B2 * | 9/2008 | Carlisi | G06F 1/183 280/47.26 |
| 7,643,280 B2 * | 1/2010 | Chen | G11B 33/123 361/679.33 |
| 8,564,946 B2 * | 10/2013 | Kadri | G06F 1/187 29/592.1 |
| 8,582,299 B1 * | 11/2013 | Phillips | H05K 7/1489 361/724 |
| 9,491,884 B2 * | 11/2016 | Chung | H05K 7/1487 |
| 2004/0100762 A1 * | 5/2004 | Yuan | G06F 1/184 361/679.39 |
| 2005/0030721 A1 * | 2/2005 | Shimada | G06F 1/181 361/726 |
| 2005/0035603 A1 * | 2/2005 | Chen | E05C 1/12 292/116 |

(Continued)

FOREIGN PATENT DOCUMENTS

JP   H1050048   2/1998

OTHER PUBLICATIONS

Optiplex 3020 Small Form Factor (SFF) CRU (customer Replaceable Parts) Removal Guide, Last Date Modified: Jan. 12, 2017, <http://www.dell.com/support/article/in/en/inbsdt1/SLN288898#Card>.

(Continued)

*Primary Examiner* — Anthony Haughton
(74) *Attorney, Agent, or Firm* — Brooks, Cameron & Huebsch, PLLC (57) ABSTRACT

Examples include a system comprising chassis and hard drive. In some examples, the hard drive has a set of positioning members and the chassis includes a hard drive slot having a guide rail unit to guide the hard drive into the hard drive slot via a positioning member of the set of positioning members on the hard drive. The chassis also includes a latch assembly connected to the hard drive slot to retain and extract the hard drive.

20 Claims, 9 Drawing Sheets

(56) References Cited

U.S. PATENT DOCUMENTS

| | | | |
|---|---|---|---|
| 2009/0016009 A1* | 1/2009 | Barrall | G06F 1/187 |
| | | | 361/679.31 |
| 2010/0208423 A1* | 8/2010 | Lai | G06F 1/187 |
| | | | 361/679.38 |
| 2012/0320521 A1* | 12/2012 | Gong | G06F 1/187 |
| | | | 361/679.38 |
| 2014/0345105 A1* | 11/2014 | Brockett | G06F 1/187 |
| | | | 29/428 |
| 2015/0014500 A1 | 1/2015 | Chen | |
| 2015/0277510 A1 | 10/2015 | Farrow | |

OTHER PUBLICATIONS

Wonder Twin Powers, Activate! Form of . . . a Fully Assembled PC, Retrieved from Internet Oct. 12, 2016, 6 pages, <http://techreport com/review/19638/corsair graphite series 600t enclosure/4>.

* cited by examiner

CHASSIS AND HARD DRIVE

BACKGROUND

Computer components such as hard drives, power supplies, processors, and the like, may be housed in a chassis. The chassis helps protect and organize these computer components. In some examples, it may be useful to easily insert and extract various components from the chassis.

BRIEF DESCRIPTION OF THE DRAWINGS

The following detailed description references the drawings, wherein.

DETAILED DESCRIPTION

A chassis may house a number of computer components, including hard drives, power supplies, processors, cooling devices, memory, and other such devices. Some components may not need to be readily or easily removed and replaced. It may be useful with other components, for instance hard drives, to be able to easily and efficiently remove old drives and add new drives.

Hard drives may be inserted or attached to a hard drive carrier, hard drive tray, or hard drive frame that is then inserted into a chassis. In some examples, the hard drive carrier, tray, or frame includes an insertion, extraction, and/or retention mechanism to allow the carrier, tray, or frame to be inserted, removed, and/or retained by the chassis. In other examples, the hard drive carrier, tray, or frame may include additional mechanisms to retain or extract the hard drive itself from the carrier, tray, or frame. Hard drive carriers, trays, and/or frames may add complexity, cost, and time, however. Moreover, the inclusion of insertion, retention, and/or extraction mechanisms on the hard drive carrier, tray, or frame may limit the chassis to particular type of carrier, tray, or frame that can be accommodated by the chassis.

Examples described herein may improve retention, insertion, and extraction of a hard drive within a chassis. In some such examples, a hard drive without a hard drive carrier, tray, or frame, may be inserted into a chassis. The hard drive may include a set of positioning members for insertion into the chassis. The chassis may include a hard drive slot and a latch assembly connected to the hard drive slot to retain and extract the hard drive. The latch assembly may include a rotatable arm, a pin shaft connected to the rotatable arm, and a pin member to engage with the pin shaft and provide a rotation point around which the latch assembly rotates. The latch assembly may also include a positioning mechanism to engage with a positioning member of the set of positioning members on the hard drive to retain and extract the hard drive. A spring member of the latch assembly may engage with the hard drive slot and may shift from a rest position to an engaged position based on the rotatable arm.

Further examples described herein may include a guide rail unit at each hard drive slot to guide another positioning member of the set of positioning members on the hard drive. In some examples, the spring member may be a torsion spring. In other examples, the spring member may be a compression spring. In yet other examples, the hard drive may comprise a hard drive attachment and a solid state drive.

The terminology used herein is for the purpose of describing particular examples only and is not intended to be limiting. As used herein, the singular forms "a," "an," and "the" are intended to include the plural forms as well, unless the context clearly indicates otherwise. A "set," as used herein, includes one or multiple items. The term "plurality," as used herein, is defined as two or more than two. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to.

Figure 1:
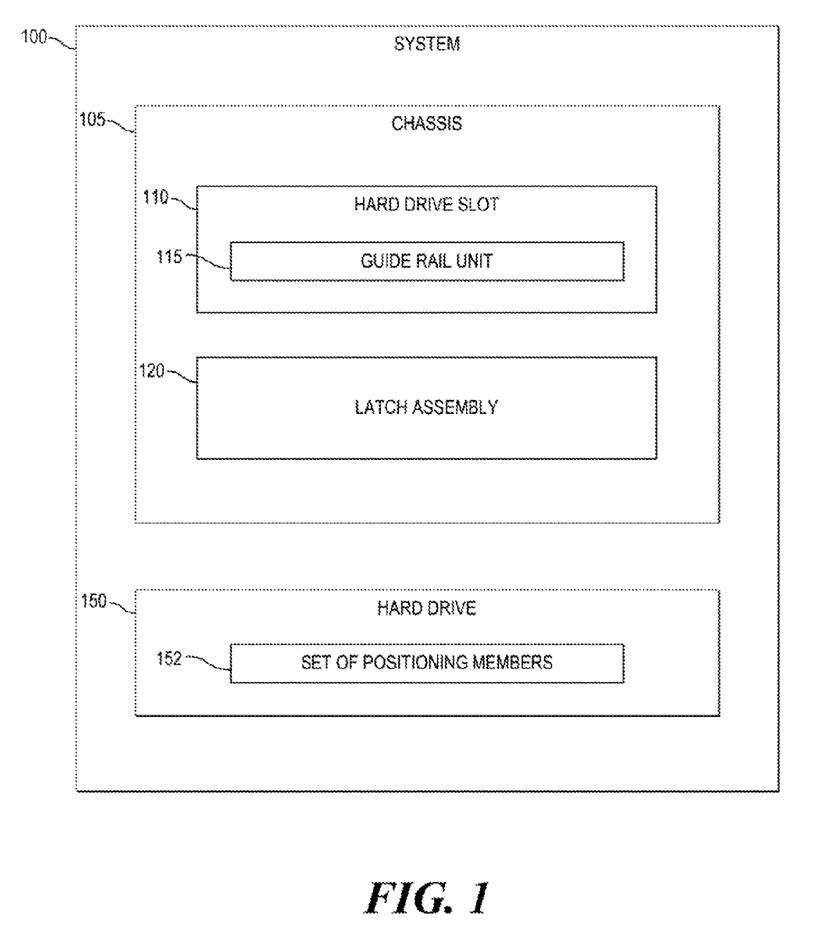
FIG. 1 is a block diagram of an example system including a hard drive and a chassis.

Referring now to the drawings, FIG. 1 is a block diagram of an example system 100 that includes a chassis 105 and a hard drive 150. A chassis, as used herein, is a housing that partially or completely encloses computer components, such as a hard drive. A hard drive, as used herein, is a non-volatile storage device that stores and retrieves data. In some examples, a hard drive may include one or multiple disks to which data is written using a magnetic head. In other examples, a hard drive may include a solid state drive.

Chassis 105 may include a hard drive slot 110 into which hard drive 150 may be inserted. Hard drive slot 110 may further include guide rail unit 115 to guide hard drive 150 into hard drive slot 110. Chassis 105 may also include a latch assembly 120 to retain and extract hard drive 150. Hard drive 150 includes a set of positioning members 152. The set of positioning members 152 may help guide hard drive 150 into hard drive slot 110 and may cooperate with latch assembly 120 to help retain and extract hard drive 150.

Figure 2:
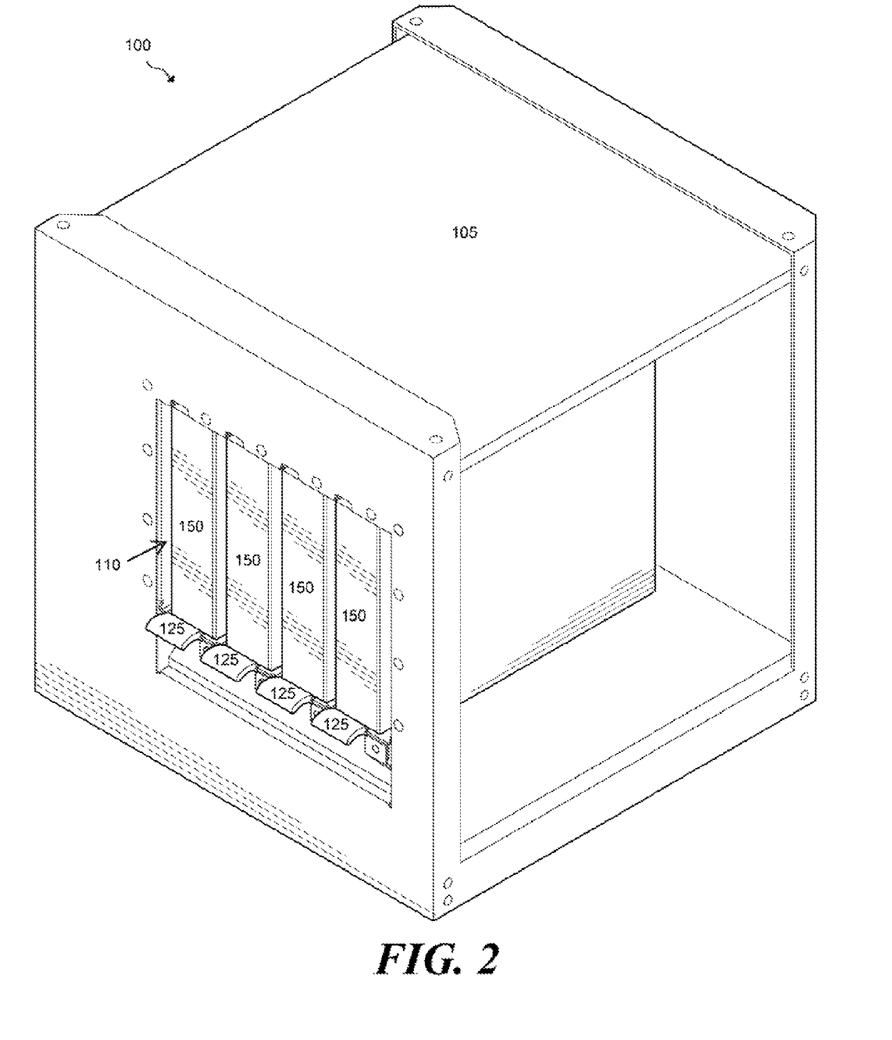
FIG. 2 is a perspective view of an example system including a hard drive and a chassis.

FIG. 2 illustrates a perspective view of system 100. System 100 includes chassis 105 and hard drives 150. As shown, hard drive 150 sits within hard drive slot 110 of chassis 105. In the example of FIG. 2, chassis 105 is shown to include a set of hard drive slots made up of four hard drive slots 110 and a set of hard drives made up of four hard drives 150. However, chassis 105 is not limited to four hard drive slots and hard drives and may include more or less hard drive slots and hard drives, as appropriate. In addition, the example of FIG. 2 illustrates a representative portion of chassis 105. Though not shown, chassis 105 may be larger than depicted and may include additional computer components. Chassis 105 further includes a latch mechanism having a rotatable arm 125.

Figure 3:
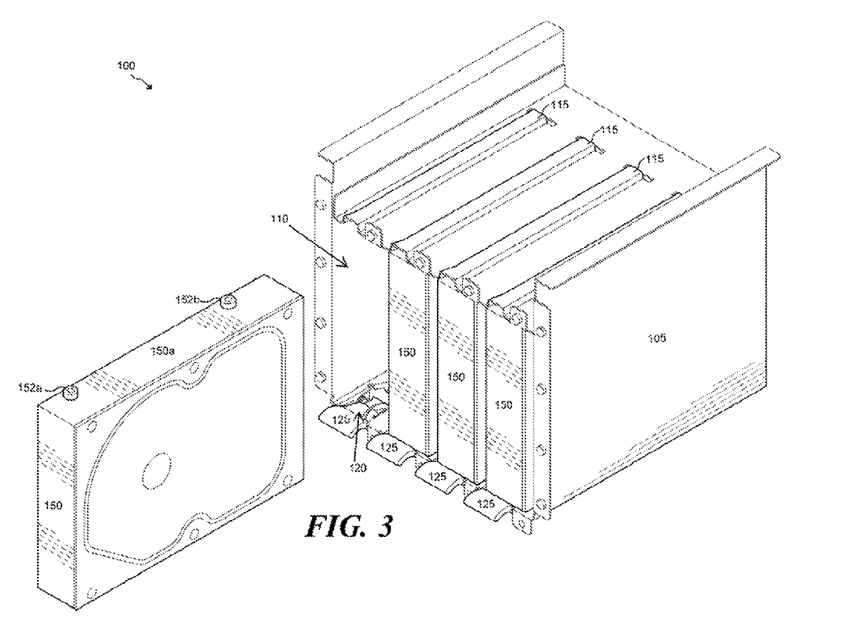
FIG. 3 is a perspective view of an example system in which a hard drive is shown removed from a chassis.

FIG. 3 illustrates a perspective view of chassis 105 in which a hard drive 150 is shown removed from chassis 105. As shown, hard drive 150 may include a set of positioning members 152a and 152b on a first lateral face 150a of hard drive 150. In some examples, positioning members 152a and 152b may be a set of screws that are inserted or fitted into openings or holes in hard drive 150. In other examples, positioning members 152a and 152b may be an upraised, molded portion of hard drive 150. In yet other examples, positioning members 152a and 152b may be attached to first lateral face 150a via an adhesive or the like.

Though two positioning members are depicted on first lateral face 150a of hard drive 150, in some examples, more or fewer positioning members may be located on first lateral face 150a. In some examples (not shown in FIG. 3), additional positioning members may be located on an opposite face of hard drive 150. Positioning members 152a and 152b may help guide hard drive 150 into hard drive slot 110 of chassis 105 via guide rail unit 115. As shown, guide rail unit 115 may have a U-shaped lateral cross-section to accommodate positioning members 152a and 152b. In other examples, depending on a shape of positioning members 152a and 152b, guide rail unit 115 may have a different lateral cross-sectional shape to accommodate the shape of the positioning members.

Figure 4:
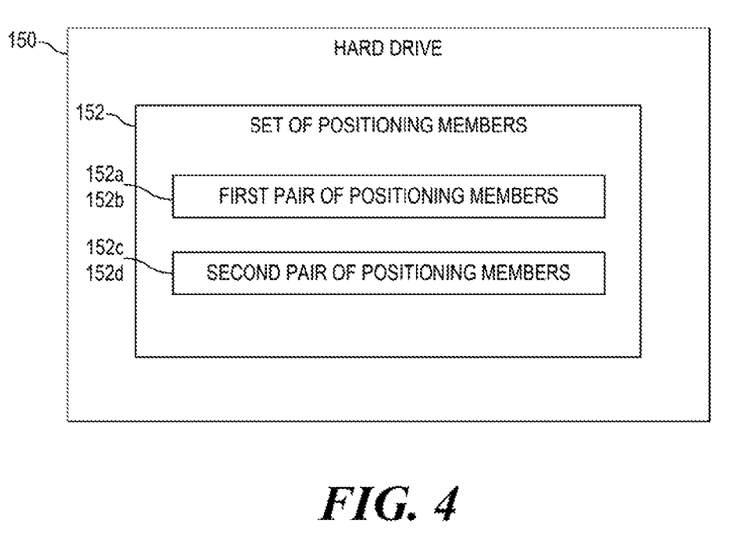
FIG. 4 is a block diagram of an example hard drive.

FIG. 4 is a block diagram of an example hard drive 150. Hard drive 150 includes a set of positioning members. In some examples, a first pair of positioning members 152a and 152b may be located on a first lateral face of hard drive 150. A second pair of positioning members 152c and 152d may be located on a second lateral face of hard drive 150. In such examples, one or multiple of the positioning members (e.g., 152a and 152b) may engage with a guide rail unit of a hard drive slot to guide hard drive 150 into the hard drive slot. Another positioning member of the set of positioning members (e.g., 152c) may engage with a latch assembly of a chassis to help retain and to help extract hard drive 150 from the chassis.

Figure 5:
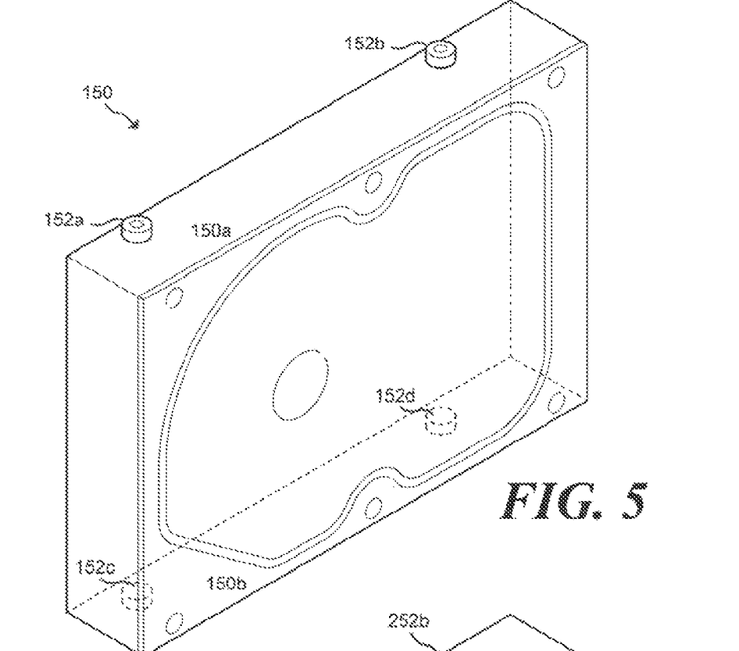
FIG. 5 is a perspective view of an example hard drive that includes a set of positioning members.
Figure 6:
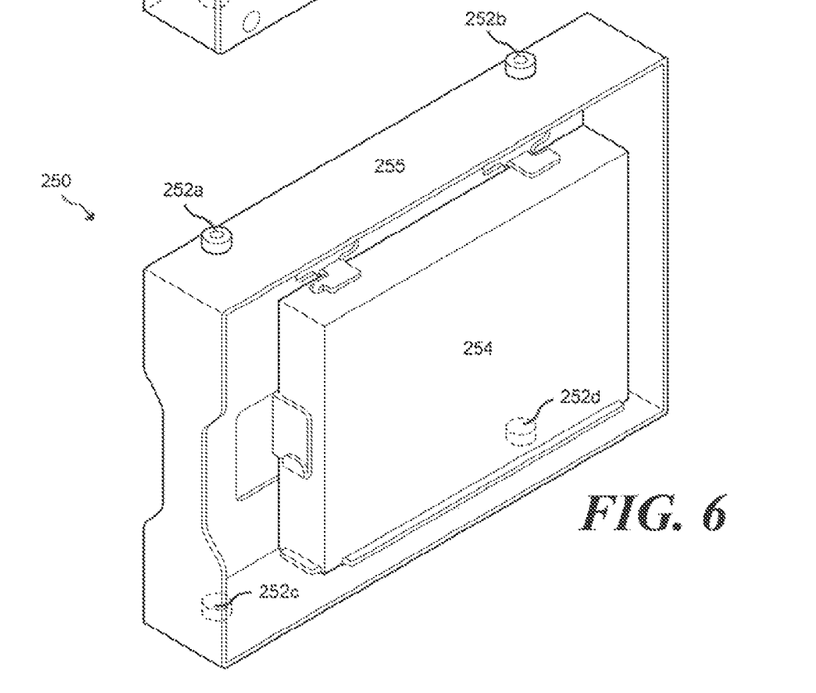
FIG. 6 is a perspective view of an example hard drive including a solid state drive and an attachment.

FIGS. 5 and 6 depict perspective views of example hard drives. FIG. 5 depicts a perspective view of an example hard drive 150. As shown, hard drive 150 has a first lateral face 150a with a first pair of positioning members 152a and 152b and a second lateral face 150b with a second pair of positioning members 152c and 152d. In the example of FIG. 5, positioning members 152a, 152b, 152c, and 152d constitute a set of positioning members.

FIG. 6 depicts a perspective view of an example hard drive. Hard drive 250 includes a solid state drive 254 and an attachment 255. Solid state drive 254 may be attached to attachment 255 via any suitable fixation method, including screws, clips, snaps, latches, adhesive, and the like. Attachment 255 is sized such that it can be inserted into a hard drive slot of a chassis. In some examples, as shown in FIG. 6, attachment 255 may include four sides and a base. In other examples, attachment 255 may include fewer sides, for instance, it may include first and second lateral faces, a base, and a third side connecting the first and second lateral faces. In yet other examples, attachment 255 may include, for instance, first and second lateral faces and a third side connecting the first and second lateral faces without a base. In such examples, solid state drive 254 may be connected to a lateral face of attachment 255. Attachment 255 further includes a set of positioning members, shown in FIG. 6 as positioning members 252a, 252b, 252c, and 252d. Positioning members 252a and 252b constitute a first pair of positioning members and positioning members 252c and 252d constitute a second pair of positioning members.

Figure 7:
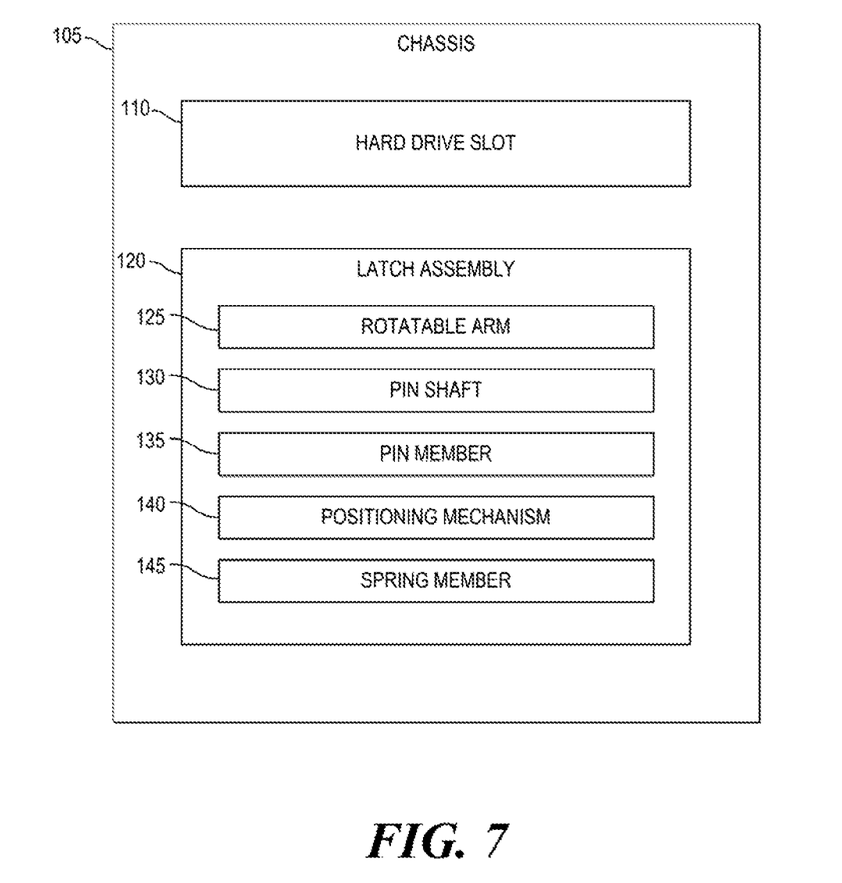
FIG. 7 is a block diagram of an example chassis.

FIG. 7 is a block diagram of an example chassis 105 that includes a hard drive slot 110 and a latch assembly 120. Latch assembly 120 further includes a rotatable arm 125, a pin shaft 130 connected to the rotatable arm, and a pin member 135 to engage with pin shaft 130 and provide a rotation axis around which latch assembly 120 rotates. Latch assembly 120 also includes a positioning mechanism 140 to engage with a positioning member of a set of positioning members on a hard drive to retain and extract the hard drive and a spring member 145 to engage with the hard drive slot, wherein the spring member shifts from a rest position to an engaged position based on a position of rotatable arm 125. In some examples, spring member 145 may be a torsion spring. In other examples, spring member 145 may be a compression spring, or any other suitable spring.

Figure 8:
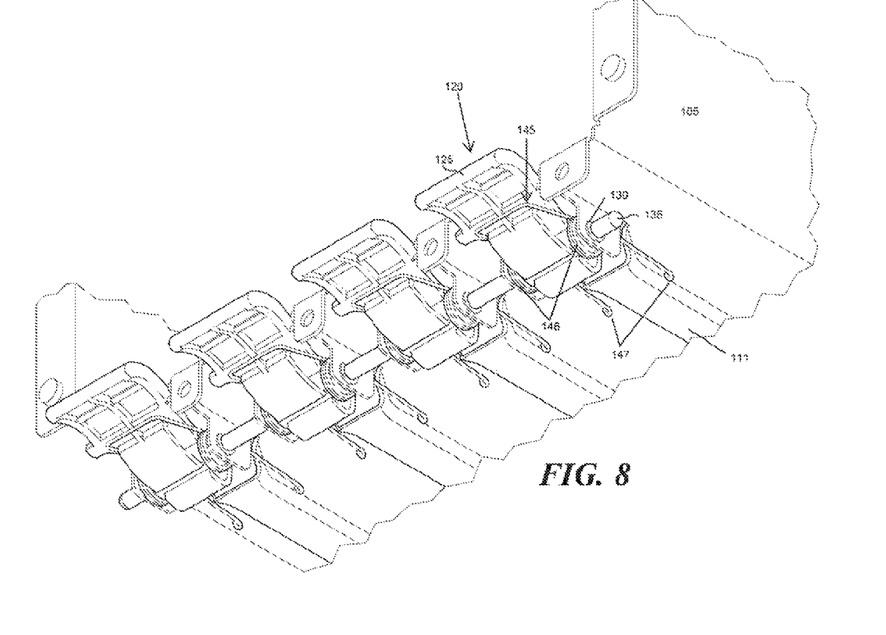
FIG. 8 is bottom-up view of an example latch assembly of a chassis.

FIGS. 8-11 depict views of a latch assembly of chassis 105. FIG. 8 is a bottom-up view of latch assembly 120 of chassis 105. Latch assembly 120 includes a rotatable arm 125. As shown, rotatable arm 125 may extend from an underside 111 of a hard drive slot. Rotatable arm 125 may act as a lever and may rotate in a downward and an upward direction, depending on the location of a force exerted on latch assembly 120. Rotatable arm 125 extends forward from and is connected to a pin shaft 130. In some examples, pin shaft 130 is a hollow, cylindrical opening in latch assembly 120 that traverses the latch assembly in a lateral direction. In such examples, a pin member 135 may engage with pin shaft 130 to provide a rotation axis around which the latch assembly rotates. For instance, pin member 135 may be an elongated cylindrical member that can be inserted into pin shaft 130 to allow latch assembly 120 to rotate around pin member 135. In other examples, pin shaft 130 and pin member 135 may be molded together such that latch assembly 120 rotates around a rotation axis provided by pin member 135.

Latch assembly 120 further includes spring member 145 to engage with hard drive slot 110. Based on a position of rotatable arm 125, spring member 145 may shift from a rest position to an engaged position. In the example of FIG. 8, spring member 145 is depicted as a torsion spring. When twisted, a torsion spring exerts a torque in the opposite direction.

In some examples, spring member 145 may include a pair of connected coils 148, which are coiled around pin shaft 130 and pin member 135. As shown in FIG. 8, the coils may be connected under rotatable arm 125 such that a downward force exerted on rotatable arm 125 causes the pair of connected coils 148 to twist around pin shaft 130 and pin member 135, shifting spring member 145 to an engaged position. When the downward force on rotatable arm 125 is removed, the torque exerted by spring member 145 in the opposite direction brings spring member 145 back to a rest position.

Each coil of spring member 145 may end in an extended spring leg that is in contact with an underside 111 of hard drive slot 110. As shown, a pair of spring legs 147 contact underside 111. In some examples, the pair of spring legs 147 may be fixed to underside 111 to prevent undue movement or slippage of spring member 145 when a force is applied to rotatable arm 125. In other examples, a spring constant K may be adjusted to prevent undue movement of the pair of spring legs 147 against underside 111 of hard drive slot 110.

Figure 9:
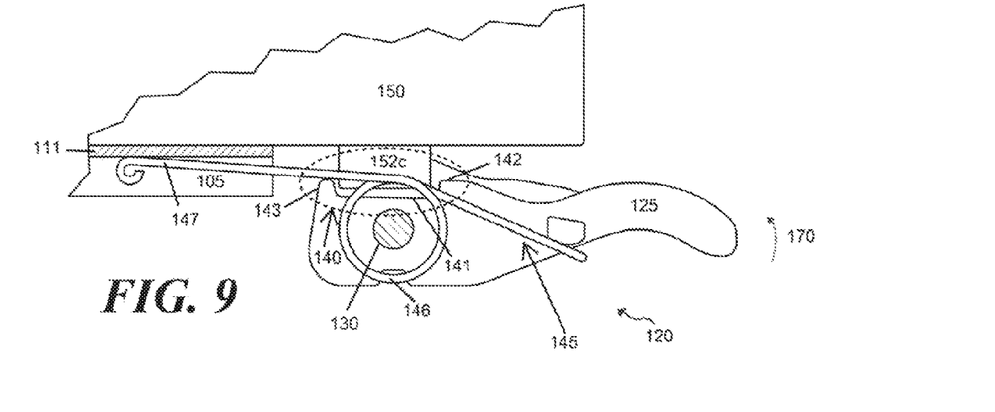
FIGS. 9 and 10 are side views of an example latch assembly in a rest position and an engaged position.

As shown in FIG. 9, which depicts a side view of latch assembly 120 with spring member 145 in a rest position, latch assembly 120 may further include a positioning mechanism 140 (encircled by a dashed line). Positioning mechanism 140 engages with a positioning member (e.g., positioning member 152c) of a set of positioning members 152 of hard drive 150 to retain and extract hard drive 150. In some examples, as shown in FIG. 9, positioning mechanism 140 may include a depression 141 to retain hard drive 150 via positioning member 152c. Positioning mechanism 140 further includes a front lip 142 and a rear lip 143 on either side of depression 141.

During insertion of hard drive 150 into hard drive slot 110, positioning member 152c may contact front lip 142, pushing front lip 142 slightly downward, and thus rotating rotatable arm 125 slightly upward in the direction of arrow 170. Once hard drive 150 is fully inserted into hard drive slot 110 of chassis 105, positioning member 152c may come to rest in depression 141 of positioning mechanism 140. In some examples, rear lip 143 may act as a backstop to prevent further rearward motion of hard drive 150. Front lip 142 and rear lip 143 act to retain hard drive 150 via positioning member 152c when spring member 145 is in the rest position.

Figure 10:
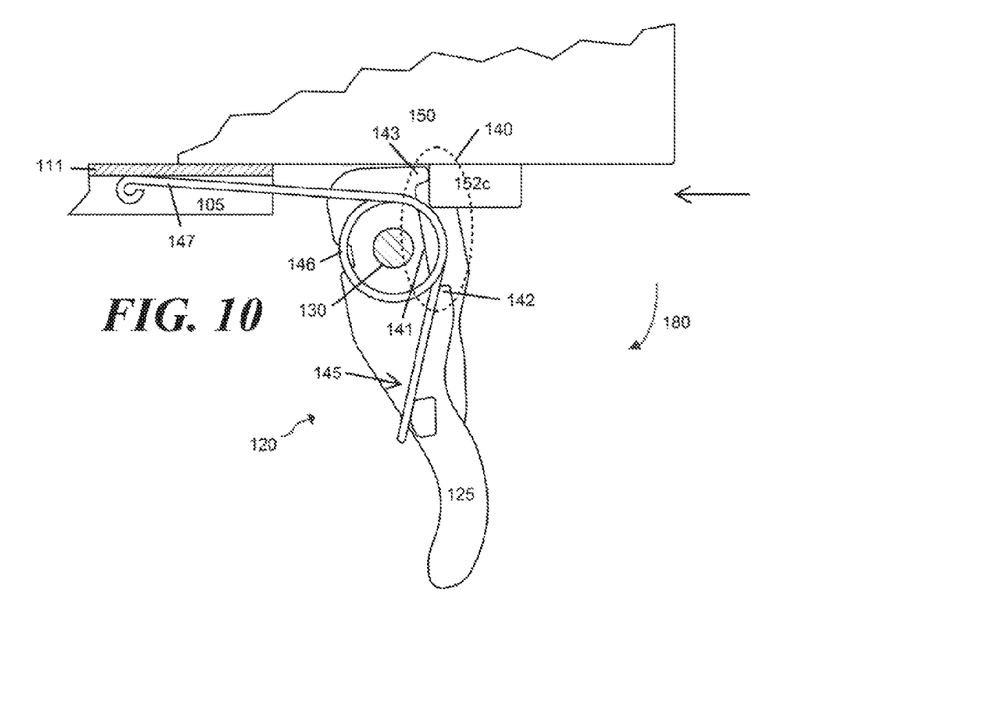

FIG. 10 depicts a side view of latch assembly 120 with spring member 145 in an engaged position. When hard drive 150 is to be extracted, a downward force may be applied to rotatable arm 125 in the direction of arrow 180, causing rotatable arm 125 to swing downwards. The downward force on rotatable arm 125 causes the pair of connected coils 146 to twist around pin shaft 130 and pin member 135. The rotation of latch assembly 120 causes rear lip 143 of positioning mechanism 140 to contact positioning member 152c. Rear lip 143 exerts a force on positioning member 152c, pushing hard drive 150 out of hard drive slot 110 for easy extraction of the hard drive. Once the downward force on rotatable arm 125 is removed, spring member 120 returns to its rest position.

Figure 11:
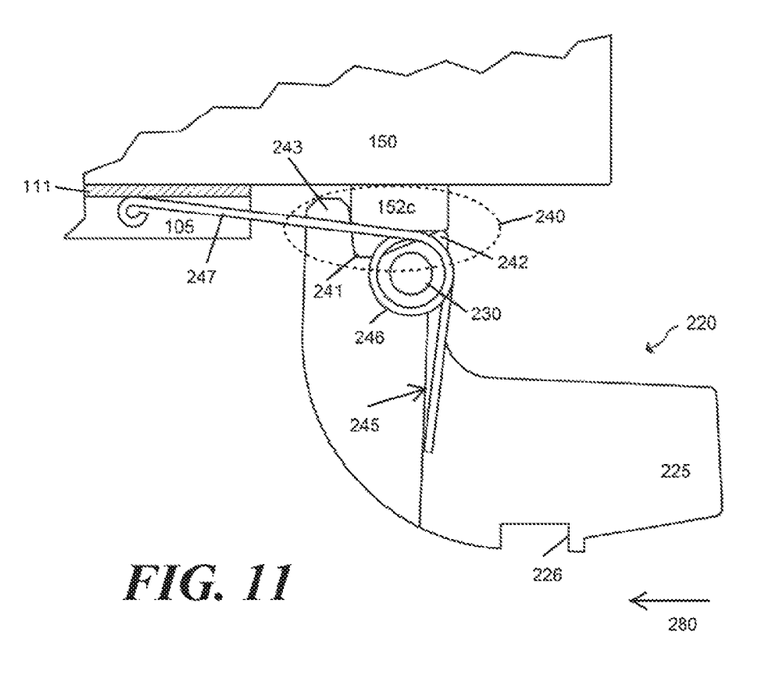
FIG. 11 is a side view of an example latch assembly in which the rotatable arm rotatable arm appears to be a push button.

FIG. 11 depicts a side view of a latch assembly 220 with spring member 245. In some examples, latch assembly 220 may be hidden from view by a panel of chassis 105 (not shown) such that only a forward portion of rotatable arm 225 is visible to a user inserting and extracting hard drives 150. In some such instances, the forward portion of rotatable arm 225 may be shaped like a button and may appear as a push button to a user.

As described above in relation to latch assembly 120, latch assembly 220 of FIG. 11 includes a positioning mechanism 240 to engage with a positioning member (e.g., positioning member 152c) of hard drive 150 to retain and extract hard drive 150. Positioning mechanism 240 has a depression 241 to retain the hard drive via positioning member 152c. A front lip 242 and a rear lip 243 form depression 241.

Latch assembly 220 also includes a pin shaft 230 connected to rotatable arm 225 and pin member (not shown) that engages with pin shaft 230 to provide a rotation axis around which latch assembly 220 rotates. Latch assembly 220 may further include a slot 226 in an underside of rotatable arm 225. A portion of chassis 105 may extend upward into slot 226 such that when rotatable arm 225 is pushed inward in the direction of arrow 280, the rotation of rotatable arm 225 is largely limited to a back and forth push button movement.

Latch assembly 220 further includes spring member 245 with a pair of connected coils 246 around pin shaft 230 and a pair of spring legs 247 in contact with the chassis. Pushing rotatable arm 225 in the direction of arrow 280 may twist spring member 245, shifting spring member 245 to an engaged position. The rotation of latch assembly 220 causes rear lip 243 of positioning mechanism 240 to contact positioning member 152c. Rear lip 243 exerts a force on positioning member 152c, pushing hard drive 150 out of hard drive slot 110 for easy extraction of the hard drive. When the force on rotatable arm 225 is removed, the torque exerted by spring member 245 in the opposite direction brings spring member 245 back to a rest position.

In other examples, spring member 245 may be a compression spring between latch assembly 220 and chassis 105 (not shown). When compressed, the compression spring is in an engaged position and exerts a force in the opposite direction. When the force on rotatable arm 225 is removed, the force exerted by the compression spring in the opposite direction brings the spring back to a rest position.

Turning again to FIGS. 3 and 8, as shown, latch assembly 120 may be one of a set of latch assemblies and hard drive slot 110 may be one of a set of hard drive slots within chassis 105. In such examples, each latch assembly of the set of latch assemblies is connected to a different hard drive slot of the set of hard drive slots such that each hard drive slot has an associated latch assembly. In some examples, each latch assembly may rotate around its own, individual pin member (not shown). In other examples, a single pin member 135 (as shown in FIG. 8) may engage with each pin shaft of the set of latch assemblies to provide a rotation axis for each of the latch assemblies.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art.

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A chassis comprising:
   a hard drive slot; and
   a latch assembly connected to the hard drive slot to retain and extract a hard drive, the latch assembly including:
      a rotatable arm,
      a pin shaft connected to the rotatable arm,
      a pin member to engage with the pin shaft and provide a rotation axis around which the latch assembly rotates,
      a positioning mechanism, to engage with a first positioning member of a set of positioning members on the hard drive to retain and extract the hard drive, including:
         the first lip that contacts the first positioning member when the hard drive is being inserted into the hard drive slot, and
         the second lip that contacts the first positioning member when the hard drive is being extracted from the hard drive slot, and
      a spring member to engage with the hard drive slot, the spring member to shift from a rest position to an engaged position based on the rotatable arm.

2. The chassis of claim 1, wherein the hard drive slot further comprises:
   a guide rail unit to guide another set of positioning members on the hard drive.

3. The chassis of claim 2, wherein a lateral cross-section of the guide rail unit is U-shaped.

4. The chassis of claim 1, wherein the rotatable arm has a slot to minimize rotation of the rotatable arm.

5. The chassis of claim 4, wherein the rotatable arm appears to be a push button to a user.

6. The chassis of claim 1, wherein the spring member is a torsion spring including:
   a pair of connected coils around the pin shaft of the latch assembly; and
   a pair of spring legs in contact with the hard drive slot.

7. The chassis of claim 1, wherein the positioning mechanism includes:
   a depression to retain the hard drive via the first positioning member; and
   a front lip and a rear lip that form the depression,
   wherein the front lip contacts the first positioning member during insertion of the hard drive, rotating the rotatable arm downward, and
   wherein the rear lip exerts a force on the first positioning member during extraction of the hard drive when the spring member is shifted from a rest position to the engaged position.

8. The chassis of claim 1, wherein the hard drive slot is one of a set of hard drive slots and the latch assembly is one of a set of latch assemblies, such that each latch assembly of the set of latch assemblies is connected to a different hard drive slot of the set of hard drive slots.

9. The chassis of claim 8, wherein the pin member engages with each pin shaft of the set of latch assemblies.

10. The chassis of claim 1, wherein the hard drive is a solid state drive with an attachment sized to the hard drive slot and wherein the set of positioning members are located on the attachment.

11. A system comprising:
    a hard drive having a first set of positioning members and a second set of positioning members, wherein the first set of positioning members are located on a first side of the hard drive and the second set of positioning members are located on a second side of the hard drive; and
    a chassis including:
       a hard drive slot having a guide rail unit to guide the hard drive into the hard drive slot via a first positioning member of the set of positioning members on the hard drive, and
       a latch assembly connected to the hard drive slot to retain and extract the hard drive and including:
          a first lip that contacts a first positioning member of the second set of positioning members when the hard drive is being guided into the hard drive slot; and
          a second lip that contacts the first positioning member of the second set of positioning members when the hard drive is being extracted from the hard drive slot.

12. The system of claim 11, wherein the latch assembly further comprises:
    a rotatable arm;
    a pin shaft connected to the rotatable arm;
    a pin member to engage with the pin shaft and provide a rotation axis around which the latch assembly rotates;
    a positioning mechanism to engage with another positioning member of the set of positioning members on the hard drive to retain and extract the hard drive; and
    a spring member to engage with the hard drive slot, the spring member to shift from a rest position to an engaged position based on the rotatable arm.

13. The system of claim 12, wherein the spring member is a torsion spring including:
    a pair of connected coils around the pin shaft of the latch assembly; and
    a pair of spring legs in contact with the hard drive slot.

14. The system of claim 12, wherein the positioning mechanism includes:
    a depression to retain the hard drive via the positioning member; and
    a front lip and a rear lip that form the depression,
    wherein the front lip contacts the positioning member during insertion of the hard drive, rotating the rotatable arm downward, and
    wherein the rear lip exerts a force on the positioning member during extraction of the hard drive when the spring member is shifted from a rest position to the engaged position.

15. The system of claim 11, wherein the rotatable arm appears to be a push button to a user and has a slot to minimize rotation of the rotatable arm.

16. The system of claim 11, wherein the hard drive slot is part of a set of hard drive slots and the latch assembly is part of a set of latch assemblies, such that each latch assembly of the set of latch assemblies is connected to a different hard drive slot of the set of hard drive slots.

17. The system of claim 11, wherein the hard drive is a solid state drive with an attachment sized to the hard drive slot and wherein the set of positioning members are located on the attachment.

18. A hard drive comprising:
    a set of positioning members including a first positioning member and a second positioning member and including:
       a first pair of positioning members on a first lateral face of the hard drive, and
       a second pair of positioning members on a second lateral face of the hard drive,
    wherein the first positioning member of the set of positioning members engages with a positioning mechanism of a latch assembly connected to a hard drive slot of a chassis to retain the hard drive within the hard drive slot,
    wherein the positioning mechanism includes:
       a first lip that contacts the first positioning member when the hard drive is being inserted, and
       a second lip that contacts the first positioning member when the hard drive is being extracted,
    wherein another set of positioning members engages with a guide rail unit of the hard drive slot to guide the hard drive into the hard drive slot, and
    wherein a second positioning member of the set of positioning members engages with another positioning mechanism.

19. The hard drive of claim 18, wherein a front lip of the positioning mechanism contacts the positioning member during insertion of the hard drive, rotating a rotatable arm of the latch assembly downward, and wherein a rear lip of the positioning mechanism exerts a force on the positioning member during extraction of the hard drive to eject the hard drive from the hard drive slot.

20. The hard drive of claim 18, further comprising:
    a solid state drive with an attachment, wherein the attachment is sized to the hard drive slot of the chassis and wherein the set of positioning members are located on the attachment.

* * * * *